United States Patent
Beaufays et al.

(10) Patent No.: US 9,275,635 B1
(45) Date of Patent: Mar. 1, 2016

(54) RECOGNIZING DIFFERENT VERSIONS OF A LANGUAGE

(71) Applicant: Google Inc., Mountain View, CA (US)

(72) Inventors: Francoise Beaufays, Mountain View, CA (US); Brian Strope, Palo Alto, CA (US); Yun-hsuan Sung, Mountain View, CA (US)

(73) Assignee: Google Inc., Mountain View, CA (US)

( * ) Notice: Subject to any disclaimer, the term of this patent is extended or adjusted under 35 U.S.C. 154(b) by 614 days.

(21) Appl. No.: 13/672,945

(22) Filed: Nov. 9, 2012

Related U.S. Application Data

(60) Provisional application No. 61/608,216, filed on Mar. 8, 2012.

(51) Int. Cl.
*G10L 15/00* (2013.01)

(52) U.S. Cl.
CPC .................................... *G10L 15/005* (2013.01)

(58) Field of Classification Search
CPC ....... G10L 15/00; G10L 15/005; G10L 15/07; G10L 15/18; G10L 15/1807; G10L 15/183; G10L 15/187; G10L 2015/00; G10L 2015/022; G10L 2015/025; G10L 2015/027; G10L 2015/0633; G10L 2015/228
USPC .................. 704/200, 231, 246, 251, 255, 257
See application file for complete search history.

(56) References Cited

U.S. PATENT DOCUMENTS

| | | | |
|---|---|---|---|
| 5,524,169 A | 6/1996 | Cohen et al. | |
| 5,805,771 A | 9/1998 | Muthusamy et al. | |
| 5,865,626 A | 2/1999 | Beattie et al. | |
| 5,987,414 A | 11/1999 | Sabourin et al. | |
| 6,125,341 A | 9/2000 | Raud et al. | |
| 6,999,932 B1 | 2/2006 | Zhou | |
| 7,383,182 B2 | 6/2008 | Taylor | |
| 7,761,297 B2 | 7/2010 | Lee | |
| 7,949,517 B2 * | 5/2011 | Eckert et al. | 704/8 |
| 8,903,053 B2 * | 12/2014 | Doulton | 379/88.01 |
| 2004/0073425 A1 | 4/2004 | Das et al. | |
| 2004/0215456 A1 | 10/2004 | Taylor | |
| 2005/0119897 A1 | 6/2005 | Bennett et al. | |
| 2007/0033039 A1 | 2/2007 | Taylor | |
| 2008/0052077 A1 | 2/2008 | Bennett et al. | |

(Continued)

OTHER PUBLICATIONS

Tucker "A Global Perspective on Bilingualism and Bilingual Education" Retrieved from the Internet: http://www.cal.org/resources.digest/digestglobal.html [retrieved on Oct. 9, 2012] (Aug. 1999) 3 pages.

(Continued)

*Primary Examiner* — Qi Han
(74) *Attorney, Agent, or Firm* — Fish & Richardson P.C.

(57) ABSTRACT

Speech recognition systems may perform the following operations: receiving audio at a computing device; identifying a language associated with the audio; recognizing the audio using recognition models for different versions of the language to produce recognition candidates for the audio, where the recognition candidates are associated with corresponding information; comparing the information of the recognition candidates to identify agreement between at least two of the recognition models; selecting a recognition candidate based on information of the recognition candidate and agreement between the at least two of the recognition models; and outputting data corresponding to the selected recognition candidate as a recognized version of the audio.

20 Claims, 5 Drawing Sheets

(56) References Cited

U.S. PATENT DOCUMENTS

| | | | |
|---|---|---|---|
| 2009/0157383 | A1 | 6/2009 | Cho et al. |
| 2010/0161337 | A1 | 6/2010 | Pulz et al. |
| 2010/0223056 | A1* | 9/2010 | Kadirkamanathan ......... 704/235 |
| 2011/0059423 | A1* | 3/2011 | Kadar et al. ................. 434/185 |
| 2011/0066634 | A1 | 3/2011 | Phillips et al. |
| 2011/0119051 | A1* | 5/2011 | Li et al. ........................... 704/10 |

OTHER PUBLICATIONS

Köhler "Language Adaptation of Multilingual Phone Models for Vocabulary Independent Speech Recognition Tasks" *ICASSP* (1998) pp. 417-420.

Vu, et al. "Rapid building of an ASR system for Under-Resourced Languages based on Multilingual Unsupervised Training" *INTERSPEECH 2011*, pp. 3145-3148.

Gales "Semi-Tied Covariance Matrices for Hidden Markov Models" *IEEE Transactions on Speech and Audio Processing*, vol. 7, No. 3 (May 1999) pp. 272-281.

Riley "OpenFst Library" [online] Retrieved from the Internet: http://www.openfst.org/twiki/bin/view/FST/WebHome [Retrieved on Oct. 9, 2012] (May 31, 2012) 2 pages.

Povey, et al. "Boosted MMI for Model and Feature-Space Discriminative Training", *ICASSP* (2008) pp. 4057-4060.

Shan "Search by Voice in Mandarin Chinese" *INTERSPEECH 2010*, pp. 354-357.

Alberti, et al. "Discriminative Features for Language Identification" *INTERSPEECH 2011*, pp. 2917-2920.

Campbell, et al. "Support vector machines for speaker and language recognition" *Computer Speech and Language 20* (2006) pp. 210-229.

Schultz, et al. "Language-independent and language-adaptive acoustic modeling for speech recognition" *Speech Communication 35* (2001, pp. 31-51.

Chang, et al. "Recognizing English queries in Mandarin Voice Search" *ICASSP 2011*, pp. 5016-5019.

Huang, et al. "System Combination to Recognize Mandarin and Accented English" *ICASSP 2012*, 4 pages.

Lin, et al. "Recognition of Multilingual Speech in Mobile Applications" *ICASSP 2012*, 4 pages.

\* cited by examiner

RECOGNIZING DIFFERENT VERSIONS OF A LANGUAGE

CROSS-REFERENCE TO RELATED APPLICATION

Priority is hereby claimed to U.S. Provisional Application No. 61/608,216, which was filed on Mar. 8, 2012. The contents of U.S. Provisional Application No. 61/608,216 are hereby incorporated by reference into this disclosure.

TECHNICAL FIELD

This disclosure relates generally to speech recognition.

BACKGROUND

Speech recognition includes processes for converting spoken words to text or other data. In general speech recognition systems translate verbal utterances into a series of computer-readable sounds and compare those sounds to known words. For example, a microphone may accept an analog signal, which is converted into a digital form that is then divided into smaller segments. The digital segments can be compared to the smallest elements of a spoken language, called phonemes (or "phones"). Based on this comparison, and an analysis of the context in which those sounds were uttered, the system is able to recognize the speech.

To this end, a typical speech recognition system may include an acoustic model, a language model, and a dictionary. Briefly, an acoustic model includes digital representations of individual sounds that are combinable to produce a collection of words, phrases, etc. A language model assigns a probability that a sequence of words will occur together in a particular sentence or phrase. A dictionary transforms sound sequences into words that can be understood by the language model.

SUMMARY

Described herein are speech recognition systems that may perform the following operations: receiving audio at a computing device; identifying a language associated with the audio; recognizing the audio using recognition models for different versions of the language to produce recognition candidates for the audio, where the recognition candidates are associated with corresponding information; comparing the information of the recognition candidates to identify agreement between at least two of the recognition models; selecting a recognition candidate based on information of the recognition candidate and agreement between the at least two of the recognition models; and outputting data corresponding to the selected recognition candidate as a recognized version of the audio. The speech recognition systems may include one or more of the following features, either alone or in combination.

Identification of the candidate language may be performed prior to, or concurrent with, recognition of the audio using the recognition models for different versions of the language. The different versions of the language may include different accents or dialects with which the language is spoken.

The operations may include selecting the recognition models for the different versions of the language. The operations may include identifying all available recognition models for the different versions of the language, and selecting all available recognition models. The recognition models may be selected based on input from a user from whom the audio is received.

Selecting the recognition models may include: identifying the language based on previously-received audio; and selecting recognition models corresponding to the identified language.

Selecting the language recognition may include: identifying the language based on previously-received audio; outputting data corresponding a user interface that presents an identity of the identified language; receiving one or more selections from the user interface corresponding to one or more versions of the identified language; and selecting recognition models based on the one or more selections.

Agreement between at least two of the recognition models may include at least two different recognition models producing a highest recognition score for a same word or phrase.

Recognition models for different versions of the language may include constituents of a single, composite recognition model for the language.

The compared information may include recognition scores.

The systems and techniques described herein, or portions thereof, may be implemented as a computer program product that includes instructions that are stored on one or more non-transitory machine-readable storage media, and that are executable on one or more processing devices. The systems and techniques described herein, or portions thereof, may be implemented as an apparatus, method, or electronic system that may include one or more processing devices and memory to store executable instructions to implement the stated functions.

The details of one or more implementations are set forth in the accompanying drawings and the description below. Other features, objects, and advantages will be apparent from the description and drawings, and from the claims.

BRIEF DESCRIPTION OF THE DRAWINGS

Like reference symbols in the various drawings indicate like elements.

DETAILED DESCRIPTION

Described herein are processes for performing speech recognition on different accents or dialects of a language. The processes may include, e.g., receiving audio, such as speech, from a user, and identifying a language of the audio, e.g., English, Spanish, French, and so forth. The processes may recognize the audio using various (e.g., all available) recognition models for different versions of the language. For example, the recognition models may be for different accents or dialects of the identified language. The recognition models produce recognition candidates for the audio, which are associated with corresponding recognition scores. The processes compare the scores of the recognition candidates to identify agreement between at least two of the recognition models. For example, if two recognition models indicate that a same recognition hypothesis most likely corresponds to the audio, there is agreement between the two recognition models. A recognition candidate is therefore selected based on its recognition scores and/or on agreement between the recognition models. Data corresponding to the selected recognition candidate (e.g., text or other audio) is produced, and output as a recognized version of the audio.

Figure 1:
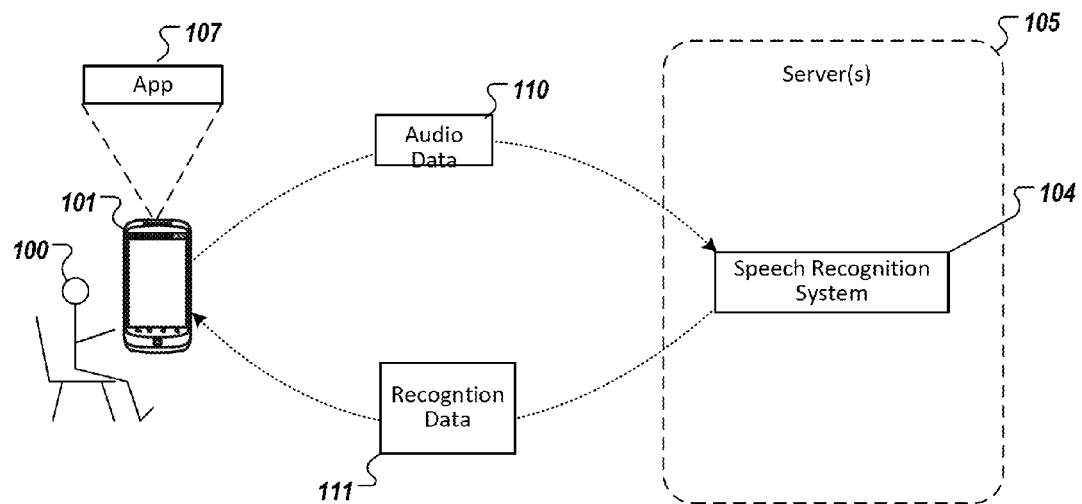
FIG. 1 illustrates, conceptually, an example of the speech recognition processes described herein.

FIG. 1 shows a conceptual example of the foregoing processes. In the example of FIG. 1, a user 100 of a mobile device 101 accesses a speech recognition system 104. In this example, the mobile device 101 is a cellular telephone having advanced computing capabilities, known as a smartphone. Speech recognition system 104 may be hosted by one or more server(s) (referred to as "server 105") that is/are remote from mobile device 101. For example, speech recognition system 104 may be part of another service available to users of the mobile device (e.g., a help service, a search service, etc.).

In this example, mobile device 101 contains an application ("app") 107 that receives audio input and that transmits data representing that input audio to the speech recognition system. The app may have any appropriate functionality, e.g., it may be a search app, a messaging app, an e-mail app, and so forth. In this regard, an app is used as an example in this case. However, all or part of the functionality of the app may be part of another program downloaded to the mobile device, part of another program provisioned on the mobile device, part of the operating system of the mobile device, or part of a service available to the device. As indicated below, the processes described herein are not limited to use on a mobile device, but rather may be used with any appropriate computing device.

In an example, the app may ask the user to identify, beforehand, the language that the user speaks. The user may select, e.g., via a touch-screen menu item or voice input, their native language and accent or dialect (e.g., British English, North American English, Australian English, and so forth). Alternatively, the user's language and accent or dialect may be determined based on the audio input itself or based on prior audio or other input, as described elsewhere herein.

To begin the speech recognition process, user 100 speaks in a language (e.g., North American English) into mobile device 101. App 107 generates audio data 110 that corresponds to the input speech, and forwards that audio data to server 105. Speech recognition system 104 on server 105 identifies the language and accent or dialect from the audio data, recognizes the audio, and generates recognition data 111 corresponding to a recognized version of the audio.

The recognition data may be provided back to mobile device 101, e.g., to app 107 on mobile device 101. App 107 may use that data to perform one or more functions, e.g., to open and/or populate a message, to generate a note, and so forth. The recognition data may be a response to a question posed by the original audio, and may constitute response audio that is played back on the mobile device. The recognition data may be sent to a search service (e.g., a search engine) as a search query to generate search results that may be sent back to the mobile device. The recognition data may be used in other appropriate ways as well.

In some example implementations, the speech recognition system may include routines for recognizing words, parts of speech, and the like in the input audio. For example, speech recognition system 104 may include a front-end system for breaking sounds into sub-parts and using those sub-parts to identify phonetic combinations, a hypothesis generator for identifying words from the phonetic combinations, and a syntactic lexicon (e.g., a dictionary) to identify phonetic sequence. In some examples, the output by the speech recognition system may be a file containing text in a self-describing computing language, such as XML (eXtensible Markup Language) or a variant thereof. Self-describing computing languages may be useful because they enable tagging of words, sentences, paragraphs, and grammatical features in a way that is recognizable to other computer programs. Thus, another computer program, such as app 107 or a search engine, can read the text file, identify, e.g., words, sentences, paragraphs, and grammatical features, and use that information as needed.

In implementations described herein, speech recognition system 104 accounts for differences in accents and dialects of a language when recognizing input audio. To this end, the speech recognition system may include various recognition models (e.g., combinations of version-specific acoustic models, language models, and dictionary(ies)) that have been trained on different versions of the same language. In some implementations, each recognition model is trained on a different version of the same language, e.g., for English: North American English, British English, Irish English and so forth; for Spanish: Castilian Spanish, Argentinean Spanish, Central American Spanish, and so forth; and similar for other languages. In some implementations, a single recognition model may be trained on two or more different versions of the same language. In any case, the language of the input audio is identified to determine the appropriate recognition models for that audio.

The input audio is then processed by the various recognition models for the identified language. In some implementations, the audio is processed by all available recognition models for the identified language (e.g., available language models for different accents and dialects). Recognition hypotheses from the various recognition models are compared in order to determine the most likely recognition candidate for the input audio. For example, if a majority of the recognition models identify the same recognition candidate as the most likely candidate for input audio, then the speech recognition system may identify that candidate as being recognition of the input audio. In this example, the most likely candidate is identified in phonetic form, the spelling thereof is obtained, and the resulting data is output. In this context, a candidate is not limited to a single or sound, but may be a sequence of sounds, a group of words, a sentence, and so forth.

By processing input audio in a particular language using recognition models for different accents or dialects, it may be possible to generate recognition candidates with increased accuracy. The recognition accuracy may increase as more recognition models are used. Furthermore, the use of different recognition models in the manner described herein may alleviate the need for a user to specify the version of a particular language that the user normally speaks. Still furthermore, the use of different recognition models in the manner described herein may account for deviations in pronunciation among speakers of a particular version of a language. For example, Bostonians may speak North American English; however, many of their pronunciations may be closer to British English than to standard North American English. The processes described herein may account for these deviations automatically, e.g., without additional input on the part of the user.

The processes described herein may be implemented in an appropriate network environment, with appropriate devices and computing equipment. An example of such a network system is provided below.

Figure 2:
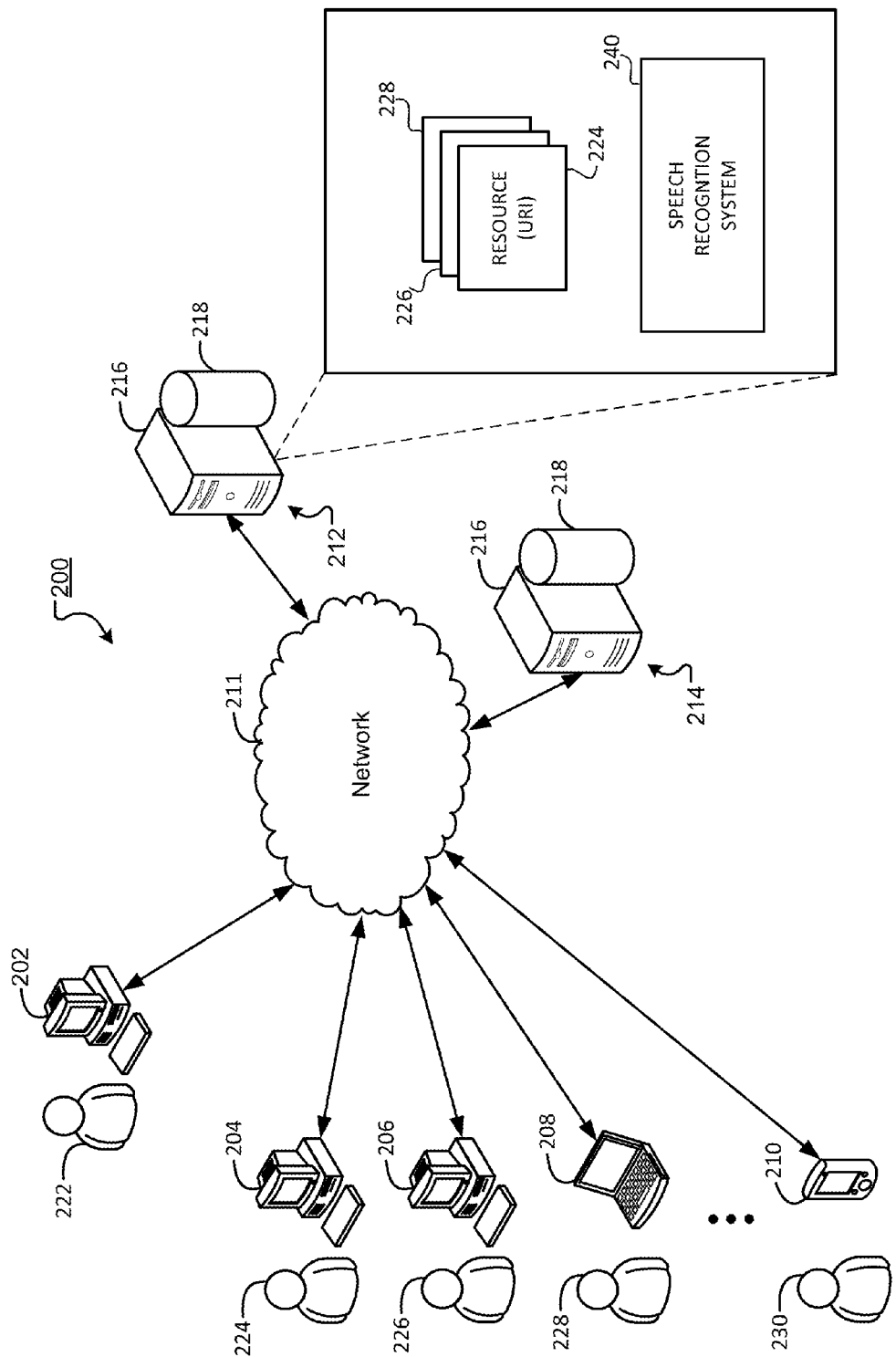
FIG. 2 illustrates an example of a network on which the speech recognition processes described herein may be implemented.

FIG. 2 is a block diagram showing an example of a network environment 200 on which the processes described herein may be implemented. Network environment 200 includes computing devices 202, 204, 206, 208, 210 that are configured to communicate with a first server system 212 and/or a second server system 214 over a network 211. Computing devices 202, 204, 206, 208, 210 have respective users 222, 224, 226, 228, 230 associated therewith. The first and second server systems 212, 214 each includes a computing device 216 and a machine-readable repository, or database 218. Example environment 200 may include many thousands of Web sites, computing devices and servers, which are not shown.

Network 211 may include a large computer network, examples of which include a local area network (LAN), wide area network (WAN), the Internet, a cellular network, or a combination thereof connecting a number of mobile computing devices, fixed computing devices, and server systems. The network(s) included in network 211 may provide for communications under various modes or protocols, examples of which include Transmission Control Protocol/Internet Protocol (TCP/IP), Global System for Mobile communication (GSM) voice calls, Short Electronic message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. Communication may occur through a radio-frequency transceiver. In addition, short-range communication may occur, e.g., using a BLUETOOTH, WiFi, or other such transceiver system.

Computing devices 202 to 210 enable respective users 222 to 230 to access and to view documents, e.g., Web pages included in Web sites. For example, user 222 of computing device 202 may view a Web page using a Web browser. The Web page may be provided to computing device(s) 202 to 210 by server system 212, server system 214 or another server system (not shown).

In example environment 200, computing devices 202, 204, 206 are illustrated as desktop-type computing devices, computing device 208 is illustrated as a laptop-type computing device, and computing device 210 is illustrated as a mobile computing device. It is noted, however, that computing devices 202 to 210 may include, e.g., a desktop computer, a laptop computer, a handheld computer, a personal digital assistant (PDA), a cellular telephone, a network appliance, a camera, a smart phone, an enhanced general packet radio service (EGPRS) mobile phone, a media player, a navigation device, an electronic messaging device, a game console, or a combination of two or more of these data processing devices or other appropriate data processing devices. In some implementations, a computing device may be included as part of a motor vehicle (e.g., an automobile, an emergency vehicle (e.g., fire truck, ambulance), a bus).

In this example implementation, server system 212 stores a plurality of resources 224, 226, 228. A resource has an associated resource identifier (Resource ID). For example, resources 224, 226, 228 may correspond to services and content available through, e.g., various Web services.

To access a service, a request may include a uniform resource indicator (URI) or a uniform resource locator (URL). A request, including the Resource ID, is transmitted, e.g., from computing device 204 to server system 212 over network 211. In response, the server system identifies the requested resource based on the Resource ID. In this case, the resource may be a speech recognition system 240. As described in more detail below, speech recognition system 240 receives input audio, recognizes that input audio, and generates an output that includes data corresponding to the recognized audio. The output may include, e.g., a textual transcription of the audio or other information representative of its content.

The output may be provided as data to the computing device that provided the input audio. For example, a user may input audio to the speech recognition system through a mobile device, such as a cellular telephone. The recognized audio may be provided to the mobile device or another service and used to control one or more functions associated with the mobile device. For example, an application on the mobile device may execute an e-mail or messaging application in response to command(s) in the recognized audio. Likewise, as noted, the recognized audio may be used to populate an e-mail or other message. Processes may be implemented, either remote from, or local to, the mobile device, to identify commands in an application, such as "send e-mail" to cause actions to occur, such as executing an e-mail application, on the mobile device In another example, the output (data for the recognized audio) may be provided as data to a search engine. For instance, the data may constitute a search query that is to be input to a search engine. The search engine may identify content (e.g., Web pages, images, documents, and the like) that are relevant to the search query, and return that information to the computing device that provided the initial audio. In some implementations, the recognized audio may be provided to the computing device prior to searching in order to confirm its accuracy.

In another example, the recognized audio may be used to determine advertisements related to the topic of the audio. Such advertisements may be provided in conjunction with output of the audio content.

Figure 3:
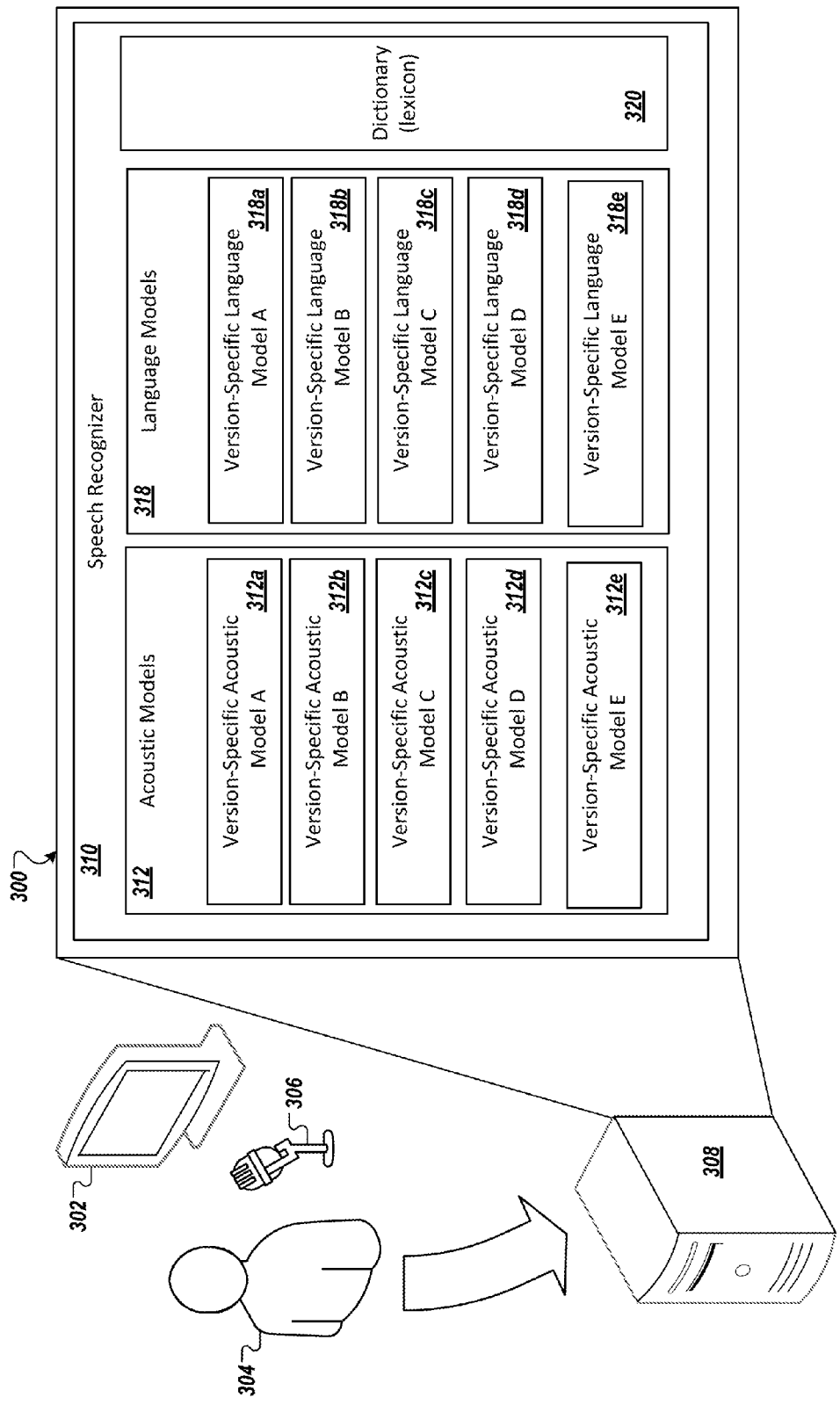
FIG. 3 illustrates an example of hardware and software with which the speech recognition processes described herein may be implemented.

FIG. 3 illustrates an example implementation 300 of speech recognition system 240 of FIG. 2. In this example, user 304 speaks into a microphone 306 of computer system 302. Computer system 302 may be any of the types of computing devices described above with respect to FIG. 2 or elsewhere herein.

The user's speech is sent to computer system 308 over a network (not shown), which may be any of the types of networks described above with respect to FIG. 2. Computer system 308 stores a speech recognizer 310 in memory. Speech recognizer 310 includes one or more executable modules that may be executed by one or more processing devices on computer system 308 to implement the speech recognition system described herein.

In this example implementation, speech recognizer 310 includes acoustic model 312, language model 318, and a dictionary 320. Acoustic model 312 is used to recognize sounds in utterances of speech. Language model 318 is used to identify recognition candidates that correspond to phonetic patterns identified by acoustic model 312. Based on the mathematical likelihoods of the recognition candidates and weights associated with the language models, a recognition candidate may be selected. The recognition candidate is typically represented phonetically, and not using standard spellings. Speech recognizer 310 can access dictionary 320 to transforms sound (phoneme) sequences into words that can be understood by an appropriate language model. Acoustic model 312 can include multiple version-specific acoustic models 312a to 312e; language model 318 can include multiple version-specific language models 318a to 318e; and dictionary 320 can include multiple version-specific dictionaries (not shown).

In more detail, acoustic model 312 maps sounds collected from input audio into component parts, called phonemes (or "phones"), which are basic sounds of a language's speech. For example, standard English can be spoken using approximately 40 phones, although that number may change for different versions (e.g., accents or dialects) of English. Acoustic model 312 identifies sounds and maps them to corresponding phones. From the phones, acoustic model 312 identifies one or more sounds that the user 304 may have spoken. In this example implementation, there are different acoustic models 312a to 312e for different versions of the same language. For example, there may be an acoustic model for different accents and or dialects of a language, e.g., an acoustic model for British English, an acoustic model for North American English, an acoustic model for Irish English, an acoustic model for Australian English, and so forth. In other implementations, a single acoustic model is used containing sounds for all versions (e.g., accents and/or dialects) of a language.

In this context, an accent refers to the way that words are pronounced in a language. For example, tomato may be pronounced "toe-mah-toe" in British English but "tə -may-toe" in North American English. Dialect refers to differences in accent, grammar and vocabulary among different versions of a language. For example, in North America, "elevator" and "lift" can mean the same thing, e.g., machinery for hoisting from one floor to another. In another example, in Scottish English (or "Scots") the indirect object of a sentence more often appears before the direct object than after the direct object, e.g., "Give me it" versus "Give it to me".

The basic elements of speech can be identical or very similar. For example, an acoustic model alone may be unable distinguish between homonyms such as "red" and "read". In another example, an acoustic model may have difficulty with words that are not homonyms but sound very similar, like "part" and "pot", particularly when spoken in a non-rhotic English accent (e.g., by Brits or Bostonians). In order to improve accuracy and select a more likely word, speech recognizer 310 uses language models 318a to 318e to identify recognition candidate words that may correspond to sounds identified by the acoustic model(s).

A language model is representative of how a language, such as English, is spoken generally. A language model may be generalized using standard word patterns in a language, e.g., the included words may be weighted based on the statistical likelihood that each will be used in everyday speech patterns. Accordingly, language models 318a to 318e contain, among other things, statistical representation of how often words co-occur in particular speech contexts. In this example, the speech contexts are accents or dialects of a single language. Accordingly, language models 318a to 318e are designated as "version-specific", since they are specific to different versions (e.g., accents or dialects) of a language.

In this regard, a language model may segment training data into two or three word parts. For example, for any two words in a language model, the language model may include a probabilistic distribution as to the identity of the third word. Words are said to occur if they are used in a sentence without any intervening words. For example, in the phrase "the quick brown fox jumped over the lazy dog" co-occurrences of two words include "the quick", "quick brown", "brown fox", "fox jumped", "jumped over", "over the", "the lazy", and "lazy dog". Co-occurrences of three words include "The quick brown", "quick brown fox", "brown fox jumped", "fox jumped over", "jumped over the", "over the lazy", "the lazy dog".

As noted above, the speech recognizer (including, e.g., acoustic models, language models, and dictionary(ies)) described herein may be customized by accent or dialect for a language. For example, there may be different accent-specific acoustic models 312a to 312e, e.g., an acoustic model trained on British English, an acoustic model trained on North American English, an acoustic model trained on Irish English, an acoustic model trained on Australian English, an acoustic model trained on southern American English, and so forth. Corresponding language models 318a to 318e may be consulted to determine the likely words represented by sounds recognized by the acoustic model(s), and may output phonetic transcriptions of words corresponding to those sounds (e.g., a recognition candidate). In some cases, multiple language models 318a to 318e can be selected and combined to create a composite language model for different accents and dialects of a language. There may be separate dictionary for each acoustic model/language model pair, or a single dictionary may be used.

Language models 318a to 318e may each include substantially the same words and phrases but have different weights associated with at least some of the words phrases included therein. The weights may be applied to words or phrases based on the statistical likelihood of each of those words or phrases appearing in speech in a particular context for a particular version (accent or dialect) of a language. For example, in a language model for British English, "lift" may be used as a noun (meaning "elevator"), as in "taking the lift to the third floor". By contrast, in North American English "lift" may be used as a verb most often and almost never as a noun, as in "try to lift that". Accordingly, different weights may be applied in the British English language model for the noun version of lift than in the North American English language model. Those different weights may be used in generating recognition hypotheses by each of the language models. Similar examples include everyday expressions that are common in some version of a language, but not others. For example, "straight off", in used often in British English to mean "right away", but less so in North American English.

In another example, words may appear in one language model but not in another language model, or at least not as often in another language model. For example, "billabong" (meaning "watering hole") may appear in language model for Australian English, but not in language models for other varieties of English. Accordingly, different weights may be associated with "billabong" and phrases containing "billabong" in the different language models.

Language models may also account for differences in pronunciation among different versions of the same language. For example, audio input may be received for the phrase "where are you going today". However, when that audio is spoken with a broad Australian accent, that audio sounds like "where are you going to die". The language models may apply appropriate weights to determine that the likely meaning of "to die" is actually "today". In a similar example, different language models may apply appropriate weights to distinguish between words that can sound similar in a particular accent, e.g., "kin" and "can" in southern American English or "black" and "block" in inland North American English. The dictionary may represent "today" with a different pronunciation for American or Australian English. If that were not the case, the acoustic models could change to accommodate the different renditions of the same written sounds in two accents.

In some implementations, sounds collected from a user may be processed in two or more passes. The sounds may be processed by performing a speech recognition process on the audio using general recognition model(s) (e.g., acoustic and language models) in order to identify the language being spoken, and then the audio may be applied to the various (e.g., two or more) various version-specific recognition models (e.g., version-specific acoustic model, version-specific language model and version-specific dictionary). In this context, a general recognition model may include models that are trained with the general vocabulary and syntax of an accepted standard version of a language, e.g., with the general American accent or standard English accent (so-called "BBC English"). In other implementations, the language being spoken may be identified based on user input or past audio input, as described in more detail below.

Figure 4:
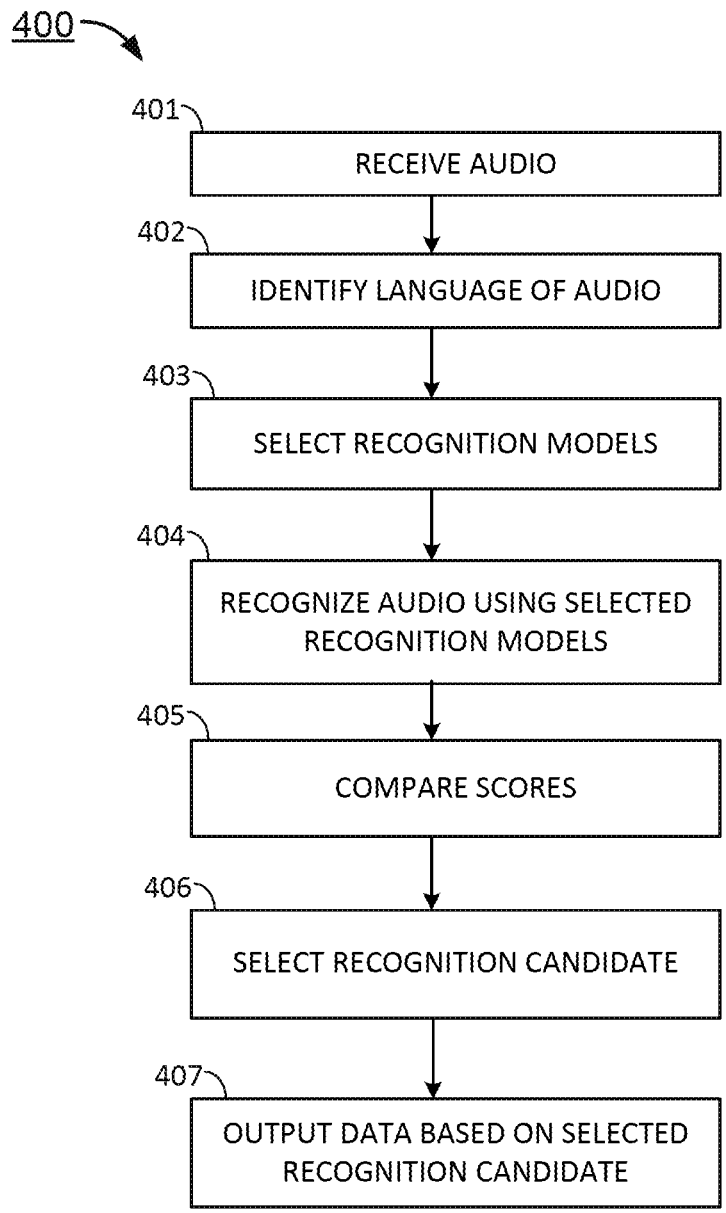
FIG. 4 illustrates a flowchart showing an example of one of the speech recognition processes described herein.

FIG. 4 is a flow diagram for an example process 400 for recognizing audio, such as speech. Process 400 may be performed by speech recognizer 310, either alone or in combination with other appropriate computer programs.

In process 400, audio is received (401). For example, speech recognizer 310 may receive audio from a computing device, such as mobile device 210 (FIG. 2). The input audio referred to herein may include all of the audio received between designated start and stop times, or a portion or snippet thereof. In the example described here, the audio is input speech; however, any type of audio may be received. For example, the audio may be a recorded musical track, a recorded track associated with video, and so forth. Phones are identified in the input audio and may be used, as described below, to identify the language of the audio.

The language of the received audio is identified (402). For example, speech recognizer 310 may include general acoustic and language models for various languages, e.g., English, Spanish, French, and so forth. These general acoustic and language models may be complete acoustic language models, e.g., for the full sound spectrum, grammar and vocabulary of each language, or they may be abbreviated acoustic and language models for use in recognizing common or frequently-used words of a particular language. The input audio may be processed by these recognition models to identify the language of the input audio. For example, input speech may be processed by recognition models for English, French and Spanish, and the resulting language identification may be used, as described below. In some examples, a limited set of recognition models may be used to perform this initial processing. For example, if speech recognizer 310 can identify the user and also knows that the user is fluent in English and French, speech recognizer may limit the recognition models to English and French. In other implementations, a larger set of recognition models (e.g., all available recognition models) may be used.

In some implementations, identification (402) of the language can occur substantially simultaneously with recognition of speech in the language described herein. Scores resulting from identification and recognition can be combined. This can occur without significant latency. It is also not necessary that the same recognition models be used to recognize the language spoken and to identify the language. Often, the models used for identification are smaller and differently-trained.

In other implementations, speech recognizer 310 may identify (402) the language of the received audio based on input from a user who is providing the audio. For example, the user may select, e.g., via a touch-screen menu item or voice input, their native (or other) language and/or accent or dialect (e.g., British English, North American English, Australian English, and so forth). Such a selection may be received and understood by speech recognizer 310.

In still other implementations, speech recognizer 310 may identify (402) the language of the received audio based on prior input from the user. For example, speech recognizer 310 may identify the user based, e.g., on identification information, such as the IP or MAC address of the user's computing device, the telephone number of the user's mobile device, and/or login information, such as a user ID and password associated with a user account. The speech recognizer may consult a profile of the user or other stored information associated with the user. In this regard, the user may prevent such information from being stored, or allow speech recognizer 310 to access such information. The information may include, e.g., past inputs about which language(s) the user speaks and/or past determinations about which language(s) the user speaks based on past input audio.

In the examples above where the language of the user is determined (rather than input by the user himself or herself), speech recognizer 310 may request confirmation that the language determination is correct. For example, speech recognizer 310 may output data identifying the language. The data may be incorporated into a user interface, which is also output by speech recognizer 310 to the user's computing device, and which allows the user to confirm that the determined language is correct and/or to input a correct language or "try again", if necessary. In a variant, speech recognizer 310 may identify the determined language, request confirmation, and also request the user to identify, either through menu input or additional speech commands, their accent or dialect of the identified language. To this end, a list of available accents or dialects may be provided audibly or visually.

The identified language is used to select (403) recognition models for use in recognizing the input audio. For example, speech recognizer 310 may identify, and select, version-specific acoustic models, language models, and dictionaries for the identified language. As noted above, the version-specific acoustic models, language models, and dictionaries, in this example, are acoustic models, language models, and dictionaries that have been trained using different accents and dialects of the identified language. In one of the examples provided above, the version-specific recognition models for English include an acoustic model, a language model, and a dictionary for British English, an acoustic model, a language model, and a dictionary for North American English, an acoustic model, a language model, and a dictionary for Irish English, an acoustic model, a language model, and a dictionary for Australian English, and an acoustic model, a language model, and a dictionary for southern American English, among others. In this regard, individual recognition models may be parts of hierarchies. For example, North American English may include sub-models for southern American English, Canadian English, inland North American English, and so forth.

In some implementations, all available version-specific recognition models for the identified language may be selected (403). So, in the above example, regardless of whether it is known that the user is from North America, a recognition model for British English, a recognition model for North American English, a recognition model for Irish English, a recognition model for Australian English, a recognition model for southern American English, and any and all others, are all selected. In other implementations, one or more subsets of all available version-specific recognition models may be selected (403). For example, if it is known that the user is from North America, a set of recognition models addressing only the accents and dialects of North America (or variants thereof) may be selected. In other examples, other criteria may be used to select (403) a set of recognition models for the identified language. The available recognition models that are selected may be selected from, e.g., one or more non-transitory storage media.

The input audio is recognized (404) using the selected recognition models. For example, acoustic model(s) for the identified language (here, English) identify phonetic patterns associated with the input audio. Each identified language model applies the output of the acoustic model(s) to the corresponding vocabulary, word combinations, and syntax of that identified language model to produce recognition candidates for the input audio. The recognition candidates are associated with corresponding scores. The score for each recognition candidate is indicative of the statistical likelihood that the recognition candidate is an accurate match for the input audio. In this example, the higher the score is for a recognition candidate, the more likely it is that the recognition candidate is an accurate match for the input audio. In some implementations, the scores of the different version-specific language models may be normalized. For example, the scores may be summed, and each score divided by that sum to produce a normalized score. In other examples "confidence scores", are determined, which are normalized and compared across recognizers.

The scores of the recognition candidates from the version-specific language recognition are compared (405). For example, speech recognizer 310 may compare all scores with each other, or a subset thereof with scores in the subset. The comparison (405) may be performed to identify agreement among two or more of the version-specific recognition models. The agreement may be that the two (or more) more version-specific recognition models have come to the same conclusion with respect to the input audio. For example, recognition candidates produced by the different recognition models may have generated the highest scores for the same word of phrase. By way of example, the audio may be a command to "search for pots". While recognition models for non-rhotic versions English alone may have difficulty distinguishing this phrase from "search for parts" (and, thereby, not necessarily generate higher recognition scores for "search for pots"), the majority of selected recognition models (for rhotic versions of English) will provide the highest recognition scores to "search for pots", which is the correct recognition of the audio input.

In other implementations, processing other than, or in addition to, comparing may be performed to identify agreement among language models.

In other example implementations, agreement does not necessarily require that two more version-specific recognition models have come to the same conclusion with respect to the input audio. For example, agreement may be signified by two or more version-specific recognition models assigning high scores to the same recognition candidate. For example, a high score may be a top score among recognition candidates, a score in the top 5%, 10%, 25%, etc. of recognition scores. Constraints as to what constitutes an agreement may be preset in the recognition system or they may be configured dynamically, e.g., on a user-by-user basis.

A recognition candidate is selected (406) based on the recognition scores (e.g., which are highest) and agreement between two or more of the version-specific language models. For example if two or more of the recognition models have the highest normalized scores for a particular recognition candidate, and no other language models, either individually or as a group, have produced higher recognition scores, then the recognition candidate may be designated by speech recognizer 310 as the correct recognition of the input audio.

In some examples, if available, other factors may influence the ultimate recognition scores. For example, if the input audio is for "I'm going today", but is pronounced by an Australian as "I'm going to die", and it is known that the user is a resident of Sydney, Australia, then the Australian English recognition model, and its corresponding output, may be weighted more heavily than others of the language models. If it is known for a fact that the user is a speaker of Australian English, then process 400 may still be performed, e.g., input audio from the user may be processed by all available language models or a portion thereof. In such cases, process 400 can still increase recognition accuracy, since speakers of a particular version of a language do not generally conform to all norms of that version and may exhibit speech characteristics (e.g., speech patterns, vocabulary, intonations, and so forth) that are more prevalent in other versions of the language.

The selected output may be a phonetic representation of the input audio, along with other appropriate information identifying the word or phrase. A dictionary 320 may be used to transforms phone sequences from an acoustic model in words that can be understood by a corresponding language model.

Data corresponding to the selected recognition candidate is output (407). For example, speech recognizer may output (407) the data to the appropriate device or process. In different examples, the output may be formatted as part of an XML file, a text transcription, a command or command sequence, a search query, and so forth. The data may be presented to the user, either audibly or visually, or it may be used as part of a process either on the user's device or elsewhere. For example, a transcription of the input audio may be applied to a translation service, which may be programmed to generate an audio and/or textual translation of the input audio into another, different language (e.g., from English to French) for output to the user's computing device. In some examples, the user may be able to specify the accent or dialect of the target language for the output audio. For example, if the input language is North American English, the user may be able to specify, e.g., Quebec or Haitian French. The specification of the accent or dialect may be done in response to an input from the user or it may be performed based on analysis of the input audio. For example, the system may select a version of the target language that is closest, geographically, to the version of the input language. Alternatively, the system may select the most popular (e.g., in terms of numbers of speakers) version of the target language. Other appropriate criteria may be used to select the accent and/or dialect of the target language.

Other examples of use of the recognized audio are above.

Recognition candidates with the highest score may be indicative of the version of a language that the user speaks. For example, if all, or a majority of, recognition candidates for input audio are from North American language models, it may be assumed that the user is a speaker of North American English and, furthermore, that the user would like access to services specific to that version of English. Accordingly, if the input audio constitutes a search query, for example, then speech recognizer 310 may direct the search query to a search engine (or other service) that is specific to the North American (or North American English) market.

Although the foregoing examples focus primarily on different versions of the English language, the processes described herein are applicable to other languages. In this regard, accents and dialects are common in most, if not all languages of the world. Accordingly, the processes described herein can be used to enhance speech recognition in a variety of languages.

Figure 5:
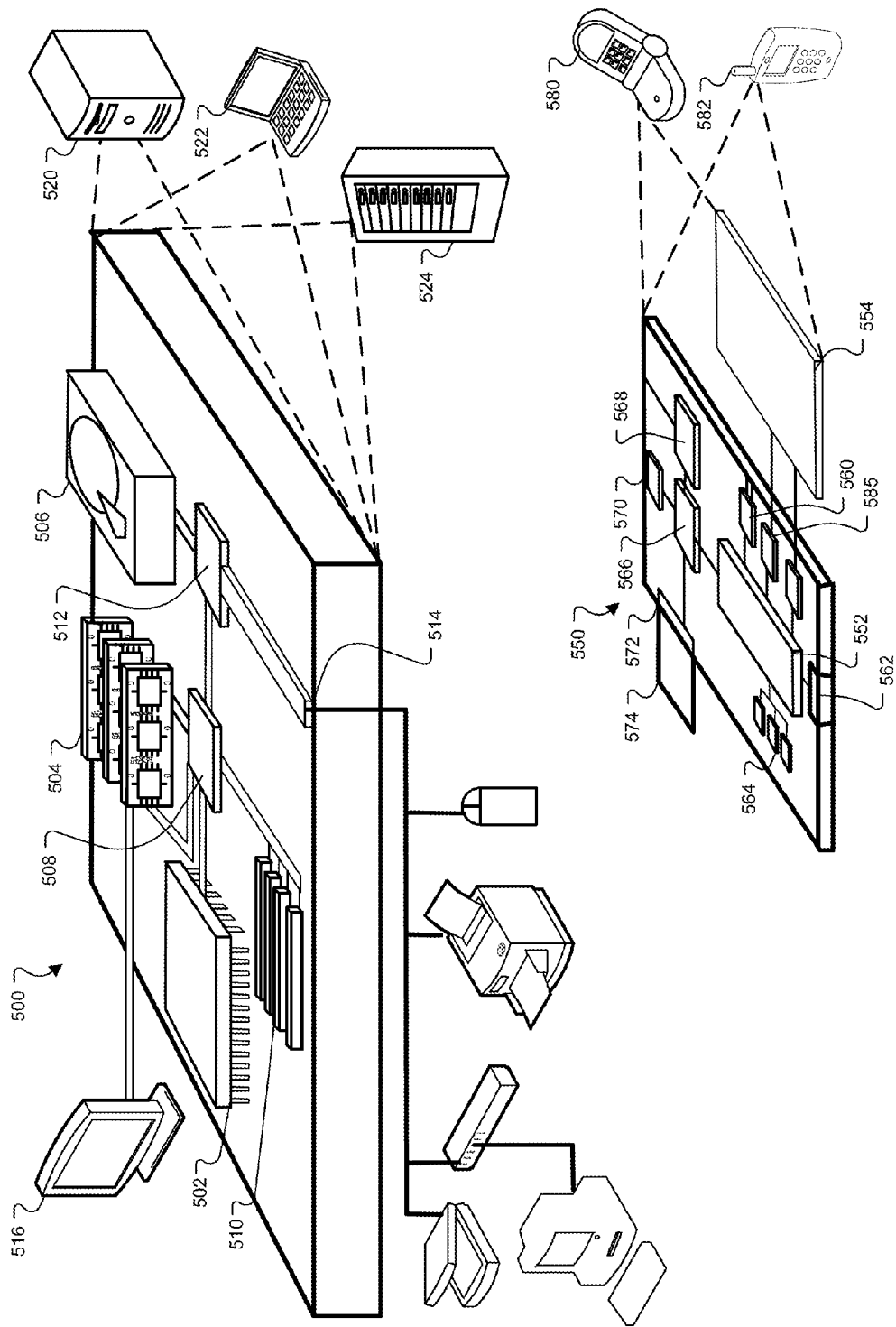
FIG. 5 shows examples of computing devices on which the processes described herein, or portions thereof, may be implemented.

The difference between an accent or dialect and a different language may sometimes be blurred. For example, Italians speak in a variety of languages, which are referred to as "dialects", mainly for political reasons. Strictly speaking, however, many languages of Italy are not dialects of standard Italian, since those other languages (e.g., Venetian, Sicilian, Sardinian, and so forth) evolved directly from Latin and not from standard Italian (originally spoken only in Tuscany). Accordingly, the processes described herein may be used with related languages, and not just with accents and dialects of the same language. For example, in some instances, e.g., for languages that are mutually intelligible, like some of the "dialects" of Italy, Russian and Ukrainian, and so forth, process 400 may be performed using recognition models for each of those different languages, in addition to recognition models for the dialects and accents associated with those languages. Processing across languages may be limited if the languages are not sufficiently mutually intelligible. In such cases, process 400 may be modified to identify the language of the input audio and other languages (e.g., mutually intelligible or other related languages) whose language models may be used to perform speech recognition FIG. 5 shows examples of computing devices on which the processes described herein, or portions thereof, may be implemented. In this regard, FIG. 5 shows an example of a generic computing device 500 and a generic mobile computing device 550, which may be used to implement the processes described herein, or portions thereof. For example, speech recognizer 310 may be implemented on computing device 500. Mobile computing device 550 may represent a client device of FIG. 1. Other client devices of FIG. 1 may also have the architecture of computing device 500.

Computing device 500 is intended to represent various forms of digital computers, examples of which include laptops, desktops, workstations, personal digital assistants, servers, blade servers, mainframes, and other appropriate computers. Computing device 550 is intended to represent various forms of mobile devices, examples of which include personal digital assistants, cellular telephones, smartphones, and other similar computing devices. The components shown here, their connections and relationships, and their functions, are meant to be exemplary only, and are not meant to limit implementations of the implementations described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Components 502, 504, 506, 508, 510, and 512, are interconnected using various busses, and may be mounted on a common motherboard or in other manners as appropriate. The processor 502 may process instructions for execution within the computing device 500, including instructions stored in the memory 504 or on the storage device 506 to display graphical information for a GUI on an external input/output device, for example, display 516 coupled to high speed interface 508. In other implementations, multiple processors and/or multiple buses may be used, as appropriate, along with multiple memories and types of memory. Also, multiple computing devices 500 may be connected, with a device providing a portion of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, examples of which include a magnetic or optical disk.

The storage device 506 is capable of providing mass storage for the computing device 500. In one implementation, the storage device 506 may be or contain a computer-readable medium, examples of which include a floppy disk device, a hard disk device, an optical disk device, or a tape device, a flash memory or other similar solid state memory device, or an array of devices, including devices in a storage area network or other configurations. A computer program product may be tangibly embodied in an information carrier. The computer program product may also contain instructions that, when executed, perform one or more methods, including those described above. The information carrier may be a non-transitory computer- or machine-readable medium, for example, the memory 504, the storage device 506, or memory on processor 502. For example, the information carrier may be a non-transitory, machine-readable storage medium.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, e.g., a keyboard, a pointing device, a scanner, or a networking device, e.g., a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer, e.g., a laptop computer 522. Alternatively, components from computing device 500 may be combined with other components in a mobile device (not shown), e.g., device 550. Such devices may contain one or more of computing device 500, 550, and an entire system may be made up of multiple computing devices 500, 550 communicating with one other.

Computing device 550 includes a processor 552, memory 564, an input/output device, e.g. a display 554, a communication interface 566, and a transceiver 568, among other components. The device 550 may also be provided with a storage device, e.g., a microdrive or other device, to provide additional storage. The components 550, 552, 564, 554, 566, and 568, are interconnected using various buses, and several of the components may be mounted on a common motherboard or in other manners as appropriate.

The processor 552 may execute instructions within the computing device 550, including instructions stored in the memory 564. The processor may be implemented as a chipset of chips that include separate and multiple analog and digital processors. The processor may provide, for example, for coordination of the other components of the device 550, e.g., control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may include appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 may be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided by the SIMM cards, along with additional information, e.g., placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, including those described above. The information carrier is a computer- or machine-readable medium, e.g., the memory 564, expansion memory 574, memory on processor 552, or a propagated signal that may be received, for example, over transceiver 568 or external interface 562.

Device 550 may communicate wirelessly through communication interface 566, which may include digital signal processing circuitry where necessary. Communication interface 566 may provide for communications under various modes or protocols, examples of which include GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, e.g., using a Bluetooth, Wi-Fi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, e.g., through a speaker, e.g., in a handset of device 550. Such sound may include sound from voice telephone calls, may include recorded sound (e.g., voice electronic messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" "computer-readable medium" refers to a computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to a signal used to provide machine instructions and/or data to a programmable processor.

To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be a form of sensory feedback (e.g., visual feedback, auditory feedback, or tactile feedback); and input from the user may be received in a form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or a combination of such back end, middleware, or front end components. The components of the system may be interconnected by a form or medium of digital data communication (e.g., a communication network). Examples of communication networks include a local area network ("LAN"), a wide area network ("WAN"), and the Internet.

The computing system may include clients and servers. A client and server are generally remote from one other and typically interact through a communication network. The relationship of client and server arises by virtue of computer programs running on the respective computers and having a client-server relationship to one other.

In some implementations, the engines described herein may be separated, combined or incorporated into a single or combined engine. The engines depicted in the figures are not intended to limit the systems described here to the software architectures shown in the figures.

For situations in which the systems discussed here collect personal information about users, or may make use of personal information, the users may be provided with an opportunity to control whether programs or features collect personal information (e.g., information about a user's social network, social actions or activities, profession, a user's preferences, or a user's current location), or to control whether and/or how to receive content from the content server that may be more relevant to the user. In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used by a content server.

Elements of different implementations described herein may be combined to form other implementations not specifically set forth above. Elements may be left out of the processes, computer programs, Web pages, etc., described herein without adversely affecting their operation. In addition, the logic flows depicted in the figures do not require the particular order shown, or sequential order, to achieve desirable results. Various separate elements may be combined into one or more individual elements to perform the functions described herein.

The features described herein may be combined in a single system, or used separately in one or more systems.

Other implementations not specifically described herein are also within the scope of the following claims.

What is claimed is:

1. A computer-implemented method comprising:
  receiving audio data that encodes an utterance;
  providing the audio data to multiple speech recognizers that are each trained on a different dialect or accent of a same language;
  receiving, from each of the multiple speech recognizers that are each trained on a different dialect or accent of a same language, (i) a transcription of the utterance, and (ii) a speech recognition confidence score;
  selecting, from among the transcriptions of the utterance that are received from the multiple speech recognizers, one or more particular transcriptions that were each generated by two or more of the multiple speech recognizers;
  selecting, from among the one or more particular transcriptions that were each generated by two or more of the multiple speech recognizers, a representative transcription based at least on the speech recognition confidence scores associated with the particular transcriptions; and
  providing the representative transcription for output.

2. The method of claim 1, comprising:
  identifying a language associated with the utterance prior to, or concurrent with, providing the audio data to the multiple speech recognizers that are each trained on a different dialect or accent of a same language.

3. The method of claim 1, comprising:
  selecting the multiple speech recognizers that are each trained on a different dialect or accent of a same language.

4. The method of claim 3, wherein selecting the multiple speech recognizers that are each trained on a different dialect or accent of a same language comprises:
  identifying all available speech recognizers that are trained on a dialect or accent of the language; and
  selecting all of the available speech recognizers that are trained on a dialect or accent of the language.

5. The method of claim of claim 3, comprising selecting the multiple speech recognizers that are each trained on a different dialect or accent of a same language based on input from a user.

6. The method of claim 3, wherein selecting the multiple speech recognizers that are each trained on a different dialect or accent of a same language comprises:
  identifying a language associated with the utterance based on previously received audio data; and
  selecting the multiple speech recognizers that are each trained on a different dialect or accent of the identified language.

7. The method of claim 3, wherein selecting the multiple speech recognizers that are each trained on a different dialect or accent of a same language based on input from a user comprises:
  identifying a language associated with the utterance based on previously received audio data;
  providing, for display at a user interface, information indicating the identified language;
  receiving data indicating one or more selections corresponding to one or more dialects or accents of the identified language, wherein the selections are made from the user interface; and
  selecting multiple speech recognizers that are each trained on one of the selected dialects or accents of the identified language.

8. The method of claim 1, wherein selecting the representative transcription based at least on the speech recognition confidence scores associated with the particular transcriptions comprises:
  determining, for each of the two or more of the multiple speech recognizers that generated the particular transcription selected as the representative transcription, that the speech recognition confidence score associated with the particular transcription and received from the speech recognizer is a highest speech recognition confidence score among all speech recognition confidence scores associated with transcriptions of the utterance generated by the speech recognizer.

9. The method of claim 1, wherein the multiple speech recognizers that are each trained on a different dialect or accent of a same language are constituents of a single, composite speech recognizer for a language.

10. One or more non-transitory machine-readable media storing instructions that are executable to perform operations comprising:
  receiving audio data that encodes an utterance;
  providing the audio data to multiple speech recognizers that are each trained on a different dialect or accent of a same language;
  receiving, from each of the multiple speech recognizers that are each trained on a different dialect or accent of a same language, (i) a transcription of the utterance, and (ii) a speech recognition confidence score;
  selecting, from among the transcriptions of the utterance that are received from the multiple speech recognizers, one or more particular transcriptions that were each generated by two or more of the multiple speech recognizers;
  selecting, from among the one or more particular transcriptions that were each generated by two or more of the multiple speech recognizers, a representative transcription based at least on the speech recognition confidence scores associated with the particular transcriptions; and providing the representative transcription for output.

11. The non-transitory machine-readable media of claim 10, wherein the operations comprise:
identifying a language associated with the utterance prior to, or concurrent with, providing the audio data to the multiple speech recognizers that are each trained on a different dialect or accent of a same language.

12. The non-transitory machine-readable media of claim 10, wherein the operations comprise:
selecting the multiple speech recognizers that are each trained on a different dialect or accent of a same language.

13. The non-transitory machine-readable media of claim 12, wherein selecting the multiple speech recognizers that are each trained on a different dialect or accent of a same language comprises:
identifying all available speech recognizers that are trained on a dialect or accent of the language; and
selecting all of the available speech recognizers that are trained on a dialect or accent of the language.

14. The non-transitory machine-readable media of claim 12, wherein the operations comprise selecting the multiple speech recognizers that are each trained on a different dialect or accent of a same language based on input from a user.

15. The non-transitory machine-readable media of claim 12, wherein selecting the multiple speech recognizers that are each trained on a different dialect or accent of a same language comprises:
identifying a language associated with the utterance based on previously received audio data; and
selecting the multiple speech recognizers that are each trained on a different dialect or accent of the identified language.

16. The non-transitory machine-readable media of claim 12, wherein selecting the multiple speech recognizers that are each trained on a different dialect or accent of a same language based on input from a user comprises:
identifying a language associated with the utterance based on previously received audio data;
providing, for display at a user interface, information indicating the identified language;
receiving data indicating one or more selections corresponding to one or more dialects or accents of the identified language, wherein the selections are made from the user interface; and
selecting the multiple speech recognizers that are each trained on one of the selected dialects or accents of the identified language.

17. The non-transitory machine-readable media of claim 10, wherein selecting the representative transcription based at least on the speech recognition confidence scores associated with the particular transcriptions comprises:
determining, for each of the two or more of the multiple speech recognizers that generated the particular transcription selected as the representative transcription, that the speech recognition confidence score associated with the particular transcription and received from the speech recognizer is a highest speech recognition confidence score among all speech recognition confidence scores associated with transcriptions of the utterance generated by the speech recognizer.

18. The non-transitory machine-readable media of claim 10, wherein the multiple speech recognizers that are each trained on a different dialect or accent of a same language are constituents of a single, composite speech recognizer for a language.

19. A system comprising:
one or more processing apparatus;
a non-transitory computer-readable storage device having stored thereon instructions that, when executed by the one or more data processing apparatus, cause the one or more data processing apparatus to performing operations comprising:
receiving audio data that encodes an utterance;
providing the audio data to multiple speech recognizers that are each trained on a different dialect or accent of a same language;
receiving, from each of the multiple speech recognizers that are each trained on a different dialect or accent of a same language, (i) a transcription of the utterance, and (ii) a speech recognition confidence score;
selecting, from among the transcriptions of the utterance that are received from the multiple speech recognizers, one or more particular transcriptions that were each generated by two or more of the multiple speech recognizers;
selecting, from among the one or more particular transcriptions that were each generated by two or more of the multiple speech recognizers, a representative transcription based at least on the speech recognition confidence scores associated with the particular transcriptions; and
providing the representative transcription for output.

20. The system of claim 19, wherein the operations comprise:
selecting the multiple speech recognizers that are each trained on a different dialect or accent of a same language.

* * * * *